United States Patent
Lai et al.

(10) Patent No.: US 9,134,963 B1
(45) Date of Patent: Sep. 15, 2015

(54) METHOD OF UNIFYING INFORMATION AND TOOL FROM A PLURALITY OF INFORMATION SOURCES

(71) Applicant: U3D HOLDINGS LIMITED, Taipei (TW)

(72) Inventors: Chen-Chun Lai, Taipei (TW); Shih-Cheng Lan, Taipei (TW); Shih-Yi Yeh, Taipei (TW); Chun-Hsiao Lin, New Taipei (TW); Wai-Tung Cheung, Taipei (TW); Ho-Cheung Cheung, Taipei (TW)

(73) Assignee: U3D LIMITED, Hong Kong (HK)

( * ) Notice: Subject to any disclaimer, the term of this patent is extended or adjusted under 35 U.S.C. 154(b) by 0 days.

(21) Appl. No.: 14/324,069

(22) Filed: Jul. 3, 2014

(51) Int. Cl.
G06F 9/44 (2006.01)

(52) U.S. Cl.
CPC ... G06F 8/20 (2013.01); G06F 8/35 (2013.01)

(58) Field of Classification Search
CPC .................................... G06F 8/20; G06F 8/35
USPC .................................................. 717/104, 105
See application file for complete search history.

(56) References Cited

U.S. PATENT DOCUMENTS

| | | | | |
|---|---|---|---|---|
| 6,199,195 | B1* | 3/2001 | Goodwin et al. | 717/104 |
| 7,152,228 | B2* | 12/2006 | Goodwin et al. | 717/146 |
| 7,895,568 | B1* | 2/2011 | Goodwin et al. | 717/108 |
| 2002/0023261 | A1* | 2/2002 | Goodwin et al. | 717/146 |
| 2004/0015819 | A1* | 1/2004 | Romano-Critchley et al. | 717/102 |
| 2006/0236302 | A1* | 10/2006 | Bateman et al. | 717/104 |
| 2009/0235230 | A1* | 9/2009 | Lucas et al. | 717/108 |
| 2011/0246530 | A1* | 10/2011 | Malafsky | 707/794 |
| 2011/0282949 | A1* | 11/2011 | Rivkin | 709/206 |
| 2013/0151705 | A1* | 6/2013 | Menon et al. | 709/226 |
| 2014/0297713 | A1* | 10/2014 | Meigen et al. | 709/203 |
| 2014/0324393 | A1* | 10/2014 | Alfassi et al. | 703/1 |

* cited by examiner

*Primary Examiner* — Qing Chen
(74) *Attorney, Agent, or Firm* — Hannah M. Tien

(57) ABSTRACT

The present invention relates to a method of unifying information and tool from a plurality of information sources, comprising (i) providing an access scheme to retrieve attributes and associated link from an original information and/or tool, requested from the plurality of information sources; and (ii) modeling with one unified data model the original information into a unified information unit via re-organizing the attributes and associated link of the original information, and modeling with another unified data model the tool into a unified tool via re-organizing the attributes and associated link of the tool, wherein the one unified data model and/or the another unified data model respectively serves for modeling format of the original information and/or the tool.

13 Claims, 5 Drawing Sheets

Figures

METHOD OF UNIFYING INFORMATION AND TOOL FROM A PLURALITY OF INFORMATION SOURCES

FIELD OF THE INVENTION

The present invention relates to a method of unifying information and tool from a plurality of information sources.

DESCRIPTION OF PRIOR ART

Information is defined as a sequence of symbols that can be interpreted as a message. Information is any kind of event that affects the state of a dynamic system that can interpret the information. Information can also be categorized according to its attribute or form, such as text, film, photo, or anything meaningful for user to access the computer.

A tool in the real world is defined as a mechanism which is used to perform or facilitate manual or mechanical work. In computer sciences the tool is often defined as an application program that creates or manipulates, modifies or analyzes information.

In our daily lives, information and tools are scattered in different information sources in different formats. Some of them are hosted for the same purpose and some of them are not. For those being hosted for different purposes, some of them still have essentially similar attributes and can be indirectly re-defined or re-purposed.

The existing art is described as below. Firstly, some internet service providers provide photo sharing services, allowing a user to store photos in his/her online storage in a specific format. Under some conditions, the user, limited by his or her working environment, is not capable of downloading the photos and processing the photos in that specific format. Therefore, it is desirable to provide a scheme to unify the photos from that specific format into one that the working environment will allow it to work with. Secondly, some service providers provide on-line music services. Users could store their MP3s on the Dropbox and categorize them in different folders which correspond to different albums. Though the MP3 placed on the Dropbox is intentionally for back-up use rather than being utilized for the content of the music service, the MP3 placed in the same folder may be deemed as the same album after being classified. Therefore, it is doable to provide a scheme to enable the user to convert in a convenient way the MP3 on the Dropbox into a reasonable format of the on-line music service providers, thereby facilitating the user to obtain and manage his/her own music resources in a more convenient manner.

Further, since there are plenty of information sources, a lot of tools have been provided. As for the music service, different tools, such as EQ Adjustment and Notch Filter, etc., have been provided. It is highly desirable to provide a scheme to model the format of the tools from different sources into a unified one and make them accessible/manageable in one working environment, thereby facilitating the user to manage his/her own resources conveniently.

SUMMARY OF THE INVENTION

The purpose of the present invention is to develop the scheme as mentioned above to model and optionally re-define the scattered information and/or tool(s) from different information sources into one unified information unit(s) and/or unified tool(s) for the user to manage the scattered information and/or tool(s) conveniently.

The present invention relates to a method of unifying information and tool from a plurality of information sources, comprising: (i) providing an access scheme to retrieve attributes and associated link from an original information and/or tool, requested from the plurality of information sources; and (ii) modeling with one unified data model the original information into a unified information unit via re-organizing the attributes and associated link of the original information, and modeling with another unified data model the tool into a unified tool via re-organizing the attributes and associated link of the tool, wherein the one unified data model and/or the another unified data model respectively serves for modeling format of the original information and/or the tool.

DETAILED DESCRIPTION OF THE INVENTION

The present invention is more fully appreciated by reference to the following description, including the following glossary of terms and the concluding examples. For the sake of brevity, the disclosures of the publications, including patents, cited in this specification are herein incorporated by reference.

The term "matterizer" used herein is a means or device to perform procedures of unifying information and tool which are explored by the present invention.

Having a service platform which is able to manage, process or access scattered information and/or tool from a plurality of different information sources is being a stronger and stronger demand from users. To achieve the goal, a unified modeling scheme is provided to facilitate the development.

The present invention is developed to provide a method of unifying original information (such as data, file, policy, rule, etc.) and tool (such as utility, application, service, etc.) from a plurality of information sources, which provides the following advantages:

1. Comparing to prior arts, a user can conveniently adopt a unified information unit and a unified tool via unifying the information and the tool from different information sources, 2. The unified information unit(s) and unified tool(s) provided by the present invention can be interactive. That is, the unified tool is allowed to process a corresponding unified information unit for accomplishing a task.

3. Rather than downloading the original information, a user can access it through a new unified information unit which is re-organized from the desired attribute(s) and the original link.

4. The trouble of non-compatible information and/or tools can be solved according to the modeling and optional re-defining process.

A plurality of information sources, in the most restricted technical sense, are a sequence of symbols that can be interpreted as an useful message to organize and label data, including: websites, intranets, online communities, software, e-books, databases and other media of information.

Figure 1:
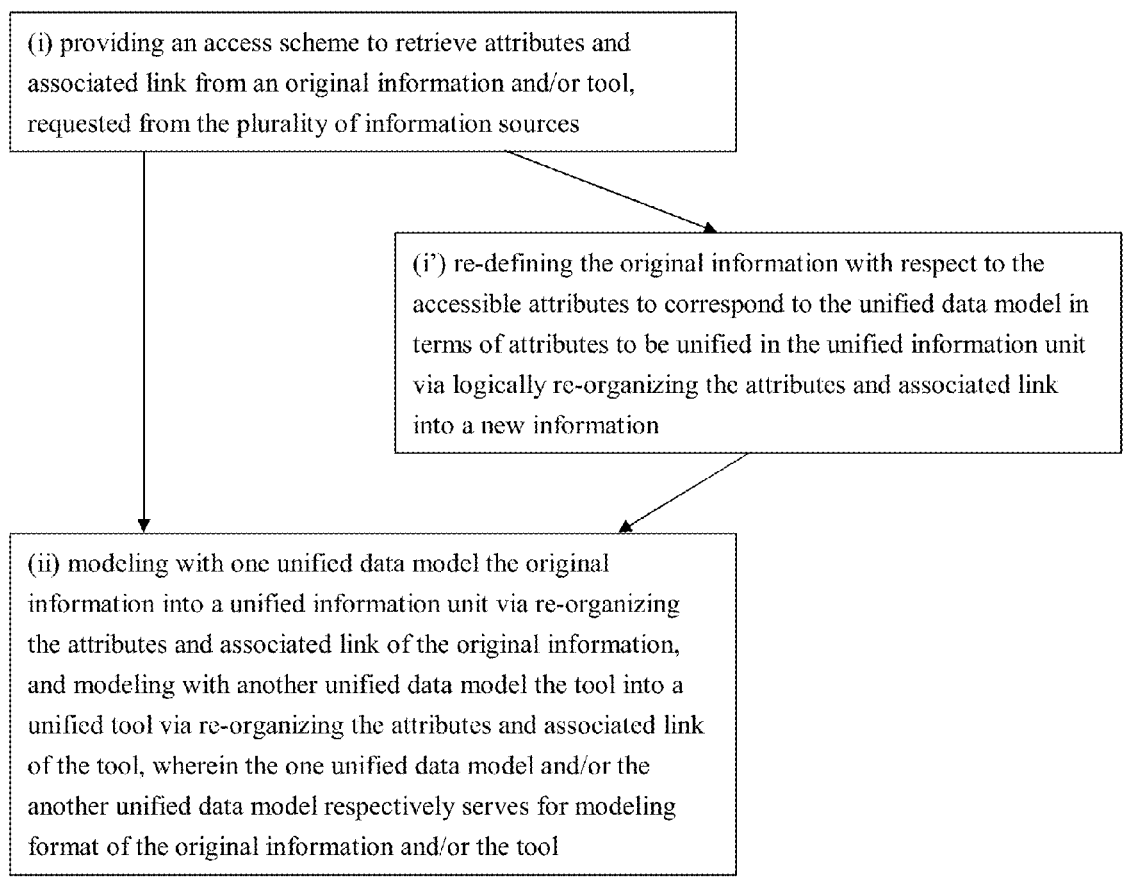
FIG. 1 shows a flow chart of the present invention.

Accordingly, as depicted in FIG. 1, the present invention provides a method of unifying information and tool from a plurality of information sources, comprising:

(i) providing an access scheme to retrieve attributes and associated link from an original information and/or tool, requested from the plurality of information sources; and (ii) modeling with one unified data model the original information into a unified information unit via re-organizing the attributes and associated link of the original information, and modeling with another unified data model the tool into a unified tool via re-organizing the attributes and associated link of the tool, wherein the one unified data model and/or the another unified data model respectively serves for modeling format of the original information and/or the tool.

In modeling the format of the information unit, basic properties of the unified information unit include a first "type", i.e. a data type; and a first "link", indicating where the information is located, in which the data type is defined by the first "type" with data content of the information being obtained via the first "link" In one embodiment, the first "link" could refer to a URL in a remote end or local end, or some block address in a memory while executing a program.

For generating a unified information unit, the unified information unit is directly produced according to the attributes and the associated link if the original information corresponds to the unified data model, and the unified information unit is indirectly produced by logically recombining the attributes and the associated link into a new information, i.e. being corresponded, if the original information does not correspond to the unified data model.

In one embodiment, the unified information unit is directly produced if the attributes accessible from the original information correspond to attributes to be unified in the unified information unit.

In another embodiment, if the attributes accessible from the original information does not correspond to the attributes to be unified in the unified information unit, the method of the present invention further comprising step (i'), before the step (ii) of modeling, re-defining the original information with respect to the accessible attributes to correspond to the unified data model in terms of attributes to be unified in the unified information unit via logically re-organizing the attributes and associated link into a new information, i.e. being corresponded, thereby indirectly producing the unified information unit.

For preparing a unified tool, the unified tool is directly produced according to the attributes and the associated link if the tool obtained from the information source is compatible with an execution environment of the unified workspace (website platform), i.e. corresponding to another unified data model. The unified tool is indirectly produced via an adapter to execute interface implementation with the unified website platform and via a software development kit (SDK) of the original tool if the original tool from the information source is incompatible with the execution environment of the unified website platform.

Further, in modeling the format of the tool, basic properties of the unified tool include a second type, i.e. a component type; and a second link, indicating where the component of the unified tool is located, in which the component type is defined by the second type, while obtaining a physical component essential to the unified tool for proceeding with plugging in, managing or executing. In one embodiment, the second link refers to a URL in a remote end or local end, or some block address in a memory while executing a program. In addition, the basic properties of the unified tool further comprise a processible information type for indicating the unified information type of the tool capable to process with, in which the processible information type is in a number from zero to a multiple number.

In one embodiment, the method of the present invention further comprises a step of producing a new unified information unit and/or unified tool, re-organized from desired attributes and an original link, without downloading the original information and/or tool.

According to the invention, the original information is a file, web page, database row, policy, rule or any data accessible in associated machines and servers and the original tool is a utility, widget, intelligent agent, application, service, or any executable component accessible in associated machines and servers.

EXAMPLE

Example 1

Direct Preparation of Unified Information Unit

Figure 2:
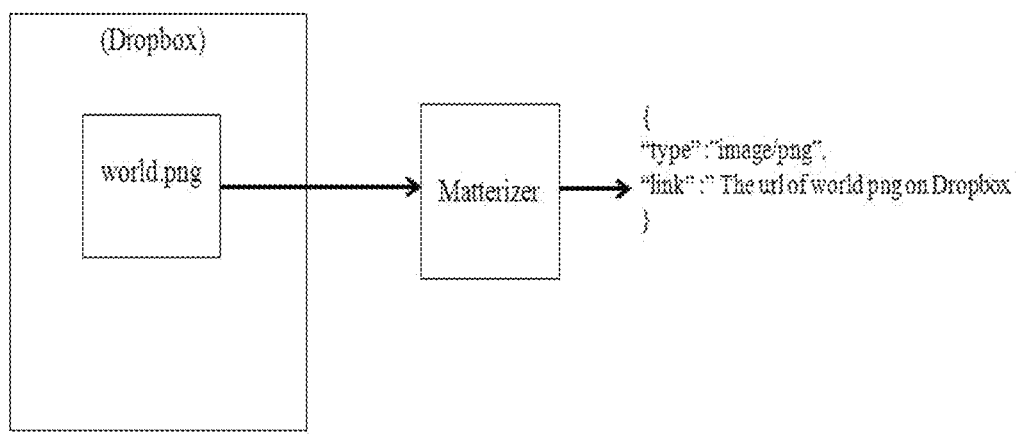
FIG. 2 illustrates one example of modeling information into a unified information unit provided by the present invention.

As shown in FIG. 2, original information of an image file in a format of portable network graphics (png) such as world.png is obtained from an information source of Dropbox. The matterizer is a means or device to perform procedures of unifying information and tool which are according the steps of the FIG. 1. The unified output model of the matterizer herein is to model a portable network graphics. The matterizer models world.png with the unified output model the attributes and the associated link of the file to one unified information unit as follows under the condition that the world.png with a png format corresponds to the unified output model.

{
"type":"image.png",
"link":"The url of world.png on Dropbox
}.

That is, the unified information unit is directly produced if attributes accessible from the original information correspond to attributes to be unified in the unified information unit.

Thus, any photo management app(s) that can recognize the unified data model above can access world.png through the produced new unified information unit.

Example 2

Indirect Preparation of Unified Information Unit

Figure 3:
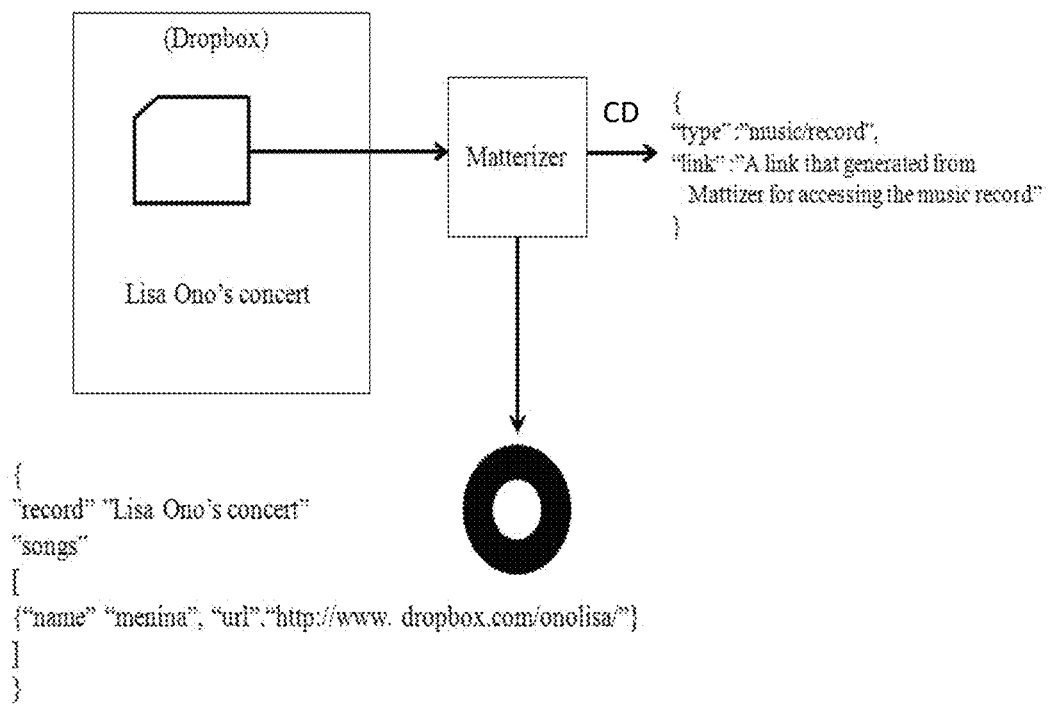
FIG. 3 illustrates one example of re-defining and modeling information into a unified information unit provided by the present invention.

As shown in FIG. 3, another original information of a folder of Dropbox stores Lisa Ono's concert. The unified output model of the matterizer herein is to model a CD playlist which is formatted in JSON structure. The folder structure of Lisa Ono's concert in Dropbox does not directly correspond to the formatted CD playlist structure but the attributes of each structure are essentially similar. The folder can map to a music record and the files in the folder can map to songs in the music record. Thus, the matterizer can first re-define folder structure into the formatted CD playlist structure by re-organizing the attributes and the associated link of the folder and produce a new CD playlist as follows:

```
{
"Record" "Lisa Ono's concert"
"songs"
[
{"name" "menina","url"."http://www.dropbox.com/ono-lisa/"}
]
}.
```

After a new CD playlist is produced, the matterizer separates the attributes from the description and the associated link of the new CD playlist, and re-organizes the new attributes such as the music/record and the associated link of the information into a unified information unit as follows:

```
{
"type":"music/record",
"link":"A link that generated from matterizer for accessing the music record (the created CD playlist)"
}.
```

As illustrated in FIG. 1, a step (i') proceeds before the step (ii) of modeling. In step (i'), the unified information unit is indirectly produced by re-defining the original information with respect to the accessible attributes to correspond to the unified data model in terms of attributes to be unified in the information unit via logically re-organizing the attributes and associated link into a new information, i.e. being corresponded, thereby indirectly producing the unified information unit, provided that attributes accessible from the original information does not correspond to attributes to be unified in the unified information unit.

Thus, any media player(s) that can recognize the aforementioned unified data model can access songs (playlist) through the produced new unified information unit. In conclusion, by separating data management app(s) (Dropbox, Evernote, etc.) and contents in the data management app, the matterizer can re-define the information and re-organize the associated link and attributes to a new unified information unit.

Example 3

Preparation of Unified Tool Under Compatible Condition

Figure 4:
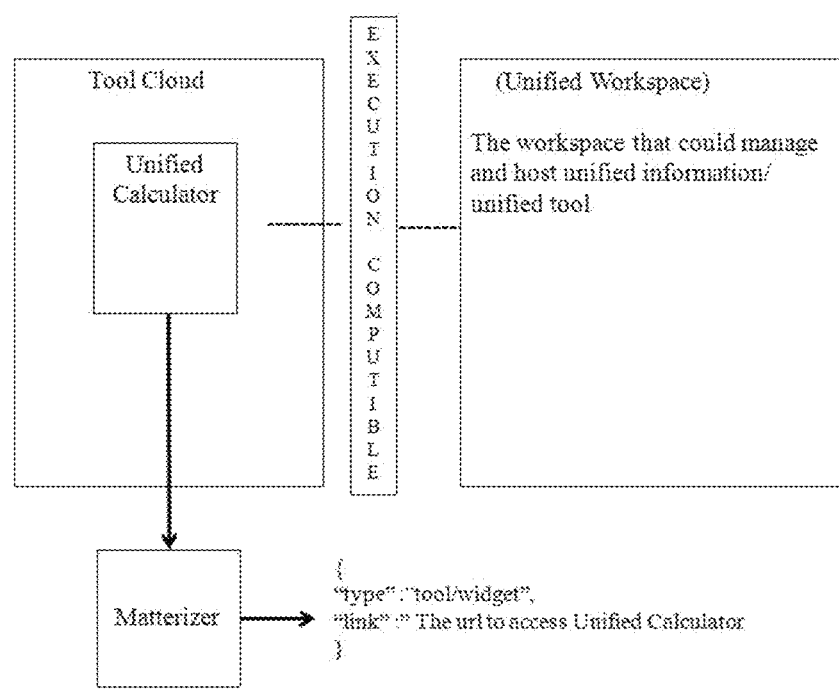
FIG. 4 illustrates one example of modeling a tool into a unified tool provided by the present invention.

As shown in FIG. 4, a tool (widget) of Unified Calculator obtained from a Tool Cloud is compatible with the execution environment of the unified workspace. The unified output model of the matterizer herein is to model a tool (widget) which is compatible with the execution environment of the unified workspace. Under the condition that the compatible Unified Calculator corresponds to the unified output model, the matterizer models Unified Calculator with the unified output model to one unified tool in terms of the attributes and the associated link of the tool (widget) as follows:

```
{
"type":"tool/widget",
"link": "The URL to access Unified Calculator"
}.
```

That is, the unified tool is directly produced if the attributes accessible from the original tool is compatible with the execution environment of the unified workspace.

Thus, any other workspace that can recognize the aforementioned unified data model and provide compatible execution environment can access the unified calculator through the produced new unified tool.

Example 4

Preparation of Unified Tool Under In-Compatible Condition

Figure 5:
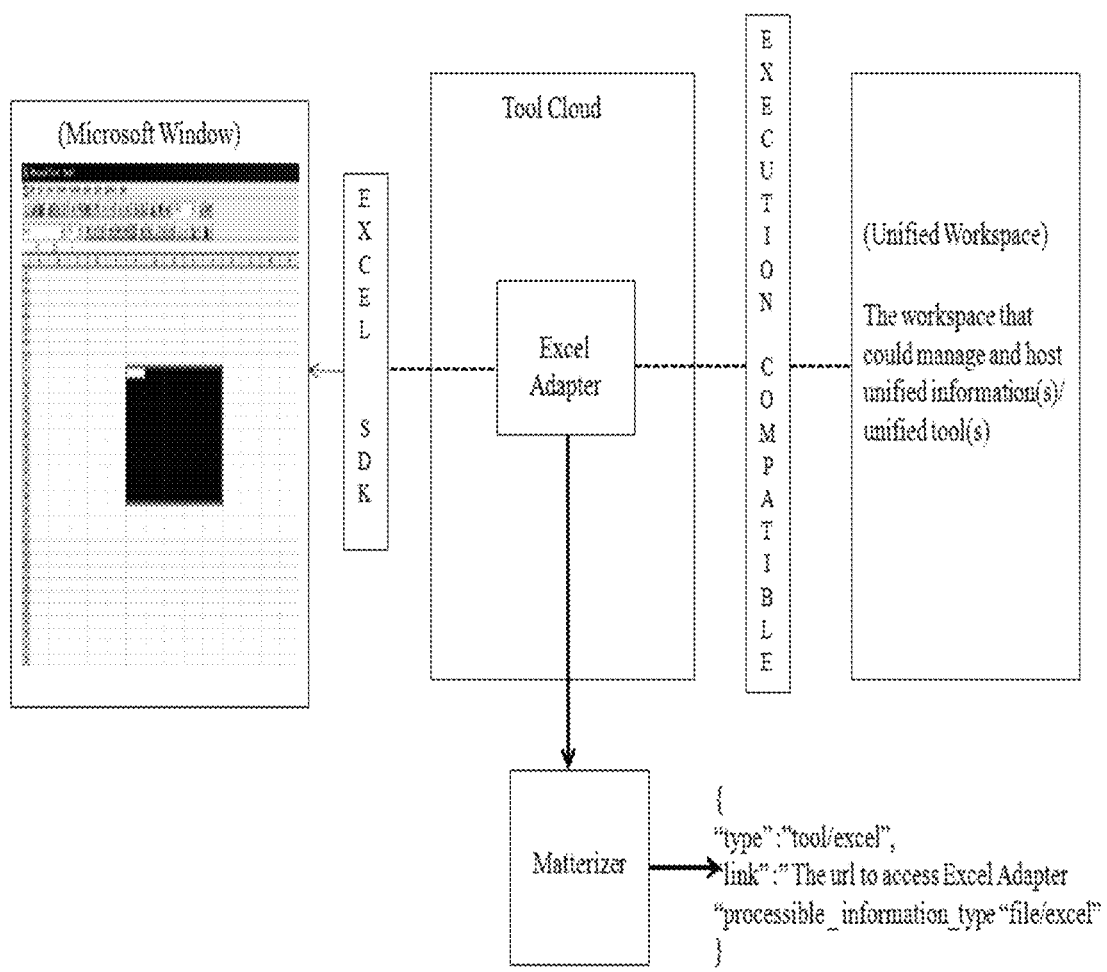
FIG. 5 illustrates one example of re-defining and modeling a tool into a unified tool provided by the present invention.

In some cases, the software or tools can only run on a particular operating system. For example, as shown in FIG. 5, Excel in Microsoft Window is incompatible with the execution environment of a unified workspace. To solve this problem and enable the software or tools to run in the unified workspace, an Excel adapter in Tool Cloud is used to execute interface implementation with the unified workspace and drive an Excel program to complete an original task via an Excel software development kit (SDK). The unified output model of the matterizer herein is to model an Excel tool which is compatible with the execution environment of the unified workspace. Then, the matterizer separates the attributes from the description and the associated link of the Excel adapter and re-organizes the attributes and associated link of the Excel adapter into one complex unified tool as follows:

```
{
"type": "tool/excel".
"link": "The url to access Excel Adapter",
"processible information type": "file/excel"
}.
```

Thus, the unified workspace and all other workspace that can provide compatible execution environment can access the Excel in Microsoft Windows indirectly via accessing the Excel adapter based on the unified tool.

In view of these examples which are illustrated in FIGS. 4 and 5, the unified tool is directly produced according to the attributes and the associated link if the tool obtained from the information source is compatible with an execution environment of the unified website platform, i.e. corresponding to the unified data model. The unified tool is indirectly produced via an adapter to execute interface implementation with the unified website platform and via a software development kit (SDK) of the tool therefrom if the tool from the information source is incompatible with the execution environment of the unified website platform.

Further, according to the method of the present invention, in modeling the format of the tool, basic properties of the unified tool include a second type, i.e. a component type; and a second link, indicating where the component of the unified tool is located, in which the component type is defined by the second type, while obtaining a physical component essential to the unified tool for proceeding with plugging in, managing or executing, the second link refers to a second URL in a remote end or local end, or some block address in a memory while executing a program, and the basic properties of the unified tool further comprise a processible information type for indicating the unified information type of the tool capable of processing with, in which the processible information type is in a number from zero to a multiple number.

Those skilled in the art recognize the foregoing outline as a description of the method for communicating hosted application information. The skilled artisan will recognize that these are illustrative only and that many equivalents are possible.

What is claimed is:

1. A method of unifying information and tool from a plurality of information sources, comprising:
    (i) providing, by a matterizer, an access scheme to retrieve attributes and an associated link from an original information and/or an original tool requested from the plurality of information sources; and (ii) modeling, by the matterizer, with one unified data model the original information into a unified information unit via re-organizing the attributes and the associated link of the original information, and modeling, by the matterizer, with another unified data model the original tool into a unified tool via re-organizing the attributes and the associated link of the original tool, wherein the one unified data model and/or the another unified data model respectively serves for modeling format of the original information and/or the original tool, wherein the unified tool is directly produced according to the attributes and the associated link when the unified tool obtained from an information source is compatible with an execution environment of a unified website platform, i.e. corresponding to the another unified data model, and wherein the unified tool is indirectly produced via an adapter to execute interface implementation with the unified website platform and via a software development kit (SDK) of the original tool when the original tool from the information source is incompatible with the execution environment of the unified web site platform.

2. The method of claim 1, wherein the unified information unit is directly produced when the attributes accessible from the original information correspond to attributes to be unified in the unified information unit.

3. The method of claim 1, further comprising step (i') before the step (ii) of modeling, re-defining, by the matterizer, the original information with respect to the attributes to correspond to the one unified data model in terms of attributes to be unified in the unified information unit via logically re-organizing the attributes and the associated link into a new information, i.e. being corresponded, thereby indirectly producing the unified information unit, provided that the attributes accessible from the original information does not correspond to the attributes to be unified in the unified information unit.

4. The method of claim 1, wherein basic properties of the unified information unit include a first type, i.e. a data type; and a first link, indicating where the original information is located, in which the data type is defined by the first type with a data component of the original information being obtained via the first link.

5. The method of claim 4, wherein the first link refers to a first uniform resource locator (URL) in a remote end or a local end, or a block address in a memory while executing a program.

6. The method of claim 4, wherein basic properties of the unified tool include a second type, i.e. a component type; and a second link, indicating where a component of the unified tool is located, in which the component type is defined by the second type while obtaining a physical component essential to the unified tool for proceeding with plugging in, managing, or executing.

7. The method of claim 6, wherein the second link refers to a second uniform resource locator (URL) in a remote end or a local end, or a block address in a memory while executing a program.

8. The method of claim 6, wherein the basic properties of the unified tool further comprise a processible information type for indicating a unified information type of the unified tool capable of processing with, in which the processible information type is in a number from zero to a multiple number.

9. The method of claim 1, further comprising producing, by the matterizer, a new unified information unit and/or a new unified tool, re-organized from desired attributes and an original link, without downloading the original information and/or the original tool.

10. The method of claim 1, wherein the original information is a file, a web page, a database row, a policy, a rule, or any data accessible in associated machines and servers.

11. The method of claim 1, wherein the original tool is a utility, a widget, an intelligent agent, an application, a service, or any executable component accessible in associated machines and servers.

12. The method of claim 1, wherein the SDK is a set of application programming interfaces (APIs) that provide methods to access, control, execute, and/or configure the original tool.

13. The method of claim 1, wherein the attributes of the original information and the original tool are obtained from embedded attributes of the associated link.

* * * * *